United States Patent [19]
Goos et al.

[11] Patent Number: 5,137,961
[45] Date of Patent: Aug. 11, 1992

[54] AQUEOUS DISPERSIONS

[75] Inventors: Hendricus C. Goos, An Dorst; Gerardus C. Overbeek, Sprang-Capelle, both of Holland

[73] Assignee: Imperial Chemical Industries PLC, London, England

[21] Appl. No.: 244,397

[22] Filed: Sep. 14, 1988

[30] Foreign Application Priority Data

Sep. 14, 1987 [GB] United Kingdom ............... 8721538

[51] Int. Cl.$^5$ .......................... C08F 2/16; C08K 3/20; C08L 9/04; C08J 3/02
[52] U.S. Cl. ...................... 524/457; 524/458
[58] Field of Search ................ 524/457, 458

[56] References Cited

U.S. PATENT DOCUMENTS

| | | | |
|---|---|---|---|
| 3,684,759 | 8/1972 | Reiff | 524/507 |
| 3,705,164 | 12/1972 | Honig | 524/591 |
| 4,644,030 | 2/1987 | Loewrigkeit | 524/457 |
| 4,730,021 | 3/1988 | Zom | 524/457 |

FOREIGN PATENT DOCUMENTS

| | | | |
|---|---|---|---|
| 3123598 | 12/1982 | Fed. Rep. of Germany | 524/457 |
| 53-72088 | 6/1978 | Japan | 524/457 |
| 2170501 | 8/1986 | United Kingdom | 524/457 |

*Primary Examiner*—Paul R. Michl
*Assistant Examiner*—Patrick Niland
*Attorney, Agent, or Firm*—Cushman, Darby & Cushman

[57] ABSTRACT

A surfactant-free aqueous polymer dispersion containing an anionic water-dispersible polyurethane and a vinyl polymer in a weight ratio of from 10:90 to 90:10, said dispersion having been obtained by:
(A) forming a solution of an anionic water-dispersible isocyanate-terminated polyurethane in at least one vinyl monomer;
(B) dispersing the solution in an aqueous medium;
(C) chain extending the polyurethane, and either
(D) adding further vinyl monomer, and
(E) initiating polymerization of the vinyl monomer, or
(F) initiating polymerization of the vinyl monomer, or
(G) adding further vinyl monomer during polymerization.

11 Claims, No Drawings

AQUEOUS DISPERSIONS

This invention relates to aqueous dispersions and more particularly to aqueous polymer dispersions containing a water-dispersible polyurethane and a vinyl polymer.

Aqueous polyurethane dispersions are well known and are used, for example, in the production of coatings and films. Dispersion of the polyurethane in the aqueous system has been achieved by the use either of external surfactants or by including appropriate ionic or nonionic groups in the polyurethane to render it self-dispersible. Thus, for example, U.S. Pat. No. 4,066,591 describes aqueous dispersions obtained by dispersing an isocyanate-terminated polyurethane prepolymer which contains anionic salt groups in an aqueous medium and then reacting the dispersed prepolymer with an active hydrogen containing chain extender.

It has also been proposed to modify the properties of polyurethane dispersions by including vinyl polymers therein. Several patents, for example U.S. Pat. Nos. 3,705,164, 4,198,330 and 4,318,833, decribe processes wherein the vinyl polymer is formed in situ by polymerising one or more vinyl monomers in the presence of an aqueous dispersion of a polyurethane containing anionic salt groups. In some cases, the polyurethane prepolymer is formed in the presence of, or subsequently diluted with, an organic solvent which serves to reduce the viscosity of the prepolymer and/or facilitate its dispersion in water. The solvent may then be removed from the dispersion by distillation as described in U.S. Pat. No. 3,705,164, a troublesome procedure, or allowed to remain as described in U.S. Pat. No. 4,318,833 and possibly adversely affect the final product and/or the environment.

In the process described in EP-A-189945, the polyurethane prepolymer is formed in the presence of vinyl monomer, thereby avoiding the need for conventional solvents. The solution of prepolymer is then dispersed in water, the prepolymer is chain extended and the vinyl monomer is subjected to suspension polymerisation using conventional free radical catalysts. However, this procedure is not entirely satisfactory, the hydrophobicity of some prepolymers and vinyl monomers being such that unstable or gelled dispersions are formed. Additionally, in the production of copolymers, no control over the copolymer composition distribution can be achieved because of the batch nature of the polymerisation process. This is a particular problem when the comonomer reactivity ratios are not well matched.

It has now been found that superior dispersions may be obtained by forming an aqueous dispersion of a solution of a prepolymer containing anionic groups in a selected amount of vinyl monomer (sufficient to provide viscosities suitable for the production of good dispersions) and then polymerising the monomer, either by free radical polymerisation following the addition of further monomer, or by conventional emulsion polymerisation techniques with further addition of monomer during the emulsion polymerisation. Furthermore, it has been found that no additional surfactant is required either at the prepolymer dispersion stage or during polymerisation of the vinyl monomer.

Accordingly, the invention provides a surfactant free aqueous polymer dispersion containing an anionic water-dispersible polyurethane and a vinyl polymer in a weight ratio of from 10:90 to 90:10, said dispersion having been obtained by:
A) forming a solution of an anionic water-dispersible isocyanate-terminated polyurethane in at least one vinyl monomer;
B) dispersing the solution in an aqueous medium;
C) chain extending the polyurethane, and either
D) adding further vinyl monomer and
E) initiating polymerisation of the vinyl monomer, or
F) initiating polymerisation of the vinyl monomer, and
G) adding further vinyl monomer during polymerisation.

Preferred dispersions contain the anionic water-dispersible polyurethane and the vinyl polymer in a weight ratio of from 20:80 to 80:20.

The anionic water-dispersible isocyanate-terminated polyurethane will be a polyurethane prepolymer having acidic residues providing water-dispersibility. Such prepolymers and methods for their preparation have been fully described in the prior art.

Polyurethane prepolymers having acidic centres include isocyanate-terminated reaction products of:
i) an organic polyisocyanate;
ii) a polymeric polyol having a molecular Weight of from 500 to 6000;
iii) an isocyanate-reactive compound having at least one acid group and at least two groups that are more reactive than the acid group towards isocyanates, and, optionally
iv) a low molecular weight polyol having a molecular weight below 500.

The polyisocyanate used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1,4-phenylene diisocyanate, 2,4-toluene diisocyanate, 2,6-toluene, diisocyanate, 4,4'-diphenylmethane diisocyanate,2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

Polymeric polyols having molecular weights in the range 500–6000 which may be used in the preparation of the prepolymer particularly include diols and triols and mixtures thereof but higher functionality polyols may be used, for example as minor components in admixture with diols. The polyols may be members of any of the chemical classes of polymeric polyols used or proposed to be used in polyurethane formulations. In particular, the polyols may be polyesters, polyesteramides, polyethers, polythioethers, polycarbonates, polyacetals, polyolefins or polysiloxanes. Preferred polyol molecular weights are from 700 to 3000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate, Polyesters obtained by the polymerisation of lactones, for example caprolactone, in conjunction with a polyol may also be used. Polyesteramides may be obtained by the inclusion of amino-alcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyesters include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polythioether polyols which may be used include products obtained by condensing thiodiglycol either alone or with other glycols, dicarboxylic acids, formaldehyde, aninoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo and copolymers.

Polyols having molecular weights below 500 which may optionally be used in the preparation of the prepolymer particularly include diols and triols and mixtures thereof but higher functionality polyols may be used. Examples of such lower molecular weight polyols include ethylene glycol, diethylene glycol, tetraethylene glycol, bis (hydroxyethyl) terephthalate, cyclohexane dimethanol, furan dimethanol, glycerol and the reaction products, up to molcular weight 499, of such polyols with propylene oxide and/or ethylene oxide.

Isocyanate-reactive compounds containing acid groups which may be used in the preparation of prepolymers having acidic centres include carboxy group containing diols and triols, for example dihydroxy alkanoic acids of the formula:

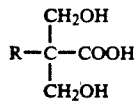

wherein R is hydrogen or alkyl. The preferred carboxy containing diol is 2,2-dimethylolpropionic acid. If desired, the carboxy containing diol or triol may be incorporated into a polyester by reaction with a dicarboxylic acid before being incorporated into the prepolymer. Useful materials include the fumarate polyether glycols described in U.S. Pat. No. 4,460,738. Other useful acid group containing compounds include amino carboxylic acids, for example lysine, cystine and 3,5-diaminobenzoic acid and sulphonic acids, for example 4,6-diaminobenzene-1,3-disulphonic acid.

The anionic water-dispersible isocyanate-terminated polyurethane prepolymer may be prepared in conventional manner by reacting a stoichiometric excess of the of the organic polyisocyanate with the polymeric polyol having a molecular weight in the range 500 to 6000 and the other required isocyanate-reactive compounds under substantially anhydrous conditions at a temperature between about 30° C and about 130° C until reaction between the isocyanate groups and the hydroxyl groups is substantially complete. The polyisocyanate and the active hydrogen containing components are suitably reacted in such proportions that the ratio of number of isocyanate groups to the number of hydroxyl groups is in the range from about 1.1:1 to about 6:1. preferably within the range of from 1.5:1 to 3:1. If desired, catalysts such as dibutyltin dilaurate and stannous octoate may be used to assist prepolymer formation.

The solution of the water-dispersible polyurethane prepolymer in vinyl monomer may be produced by adding one or more vinyl monomers to the prepolymer or, preferably by forming the prepolymer in the presence of one or more vinyl monomers.

Suitable vinyl monomers in which the prepolymer may be dissolved contain one or more polymerisable ethylenically unsaturated groups. Preferred monomers are liquid under the temperature conditions of prepolymer formation although the possiblity of using solid monomers in conjunction with organic solvents is not excluded. It is also preferred to use monomers which do not contain isocyanate or isocyanate - reactive groups.

Thus, suitable monomers include ethylenically unsaturated hydrocarbons, esters and ethers, especially esters of acrylic and methacrylic acids, esters and ethers of vinyl alcohol and styrene. Specific examples include butadiene, isoprene, styrene, substituted styrenes, the lower alkyl (C1-6) esters of acrylic, methacrylic and maleic acids, vinyl acetate, butyrate, acrylate and methacrylate, acrylonitrile, allyl methacrylate, vinyl methyl, propyl and butyl ethers, divinyl ether, divinyl sulphide, vinyl chloride, vinylidene chloride, hexanediol diacrylate, trimethylolpropane triacrylate and the like. Free acids should not be employed since they may destabilise the dispersion.

The prepolymer/vinyl monomer solution may be dispersed in water using techniques well known in the art. Preferably, the solution is added to the water with agitation or, alternatively, water may be stirred into the solution.

The active hydrogen containing chain extender which is reacted with the prepolymer is suitably a polyol, an amino alcohol, ammonia, a primary or secondary aliphatic, alicyclic, aromatic, araliphatic or heterocyclic amine especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'methylenebis (2-chloraniline), 3,3'-dichloro-4,4'bi-phenyl diamine, 2,6-diaminopyridine, 4,4'-diaminodiphenylmethane, menthane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of prepolymer and vinyl monomer or, alternatively, it may already be present in the aqueous medium when the prepolymer and monomer are dispersed therein.

The chain extension can be conducted at elevated, reduced or ambient temperatures. Convenient temperatures are from about 5° to 95° C or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 0.7 to 2.00:1. Of course when water is employed as the chain extender, these ratios will not be applicable since the water, functioning both as chain extender and dispersing medium, will be present in a gross excess relative to the free-NCO groups.

The conversion of any acid groups present in the prepolymer to anionic groups may be effected by neutralising the said acidic groups before, after or simultaneously with formation of the aqueous dispersion. Suitable neutralising agents include tertiary amines such as triethylamine.

Polymerisation of the vinyl monomer or monomers may be effected by one of two methods.

In the first method, additional monomer (the same or different vinyl monomer or monomer mixture) is added and may swell the polyurethane. The monomer may then be polymerised using a conventional free radical initiator system. The proportion of monomer used as solvent for the prepolymer is suitably from 1.5 to 95%, preferably from 2.5 to 80% and more preferably from 7 to 50% by weight of the total monomers.

In the second method, polymerisation of the vinyl monomer diluent and feeding of the same or a different vinyl monomer or monomer mixture is allowed to continue until complete. The proportion of monomer used as solvent for the prepolymer may be as indicated for the first method.

In either method of polymerisation, the vinyl monomers which may be added and polymerised include those mentioned above. Functional monomers such as hydroxyalkyl acrylates and methacrylates may also be incorporated at this stage since the free isocyanate groups of the prepolymer will have reacted with the chain extender.

Suitable free radical initiators include mixtures partitioning between the aqueous and organic phases, for example a combination of t-butyl hydroperoxide, isoascorbic acid and Fe.EDTA.

The aqueous polymer dispersions produced by the method of the invention are stable for long periods of time despite the absence of emulsifiers or organic solvents. If desired, minor amounts of emulsifiers and/or solvents may be included in the dispersions.

The dispersions obtained by the method of the invention may be employed as coating compositions and may be applied to any substrate including wood, metals, glass, cloth, leather, paper, plastics, foam and the like, by an conventional method including brushing, dipping, flow coating, spraying and the like. Films obtained from the coating compositions may be used as adhesives in the production of composite articles.

The invention is illustrated but not limited by the following Examples in which all parts and percentages are by weight.

EXAMPLE 1

A prepolymer solution was prepared from the following ingredients:

|  | Parts |
| --- | --- |
| Isophorone diisocyanate | 33.9 |
| Dimethylolpropionic acid | 6.0 |
| Polycarbonate diol | 58.9 |
| Trimethylolpropane | 0.6 |
| Cyclohexane dimethanol | 0.6 |
| Methyl methacrylate | 42.8 |

The prepolymer solution was then neutralised with triethylamine, dispersed in water and extended with ethylene diamine using no surfactant.

A monomer mixture containing 97.2 parts of methyl methacrylate and 93 parts of butyl acrylate was added to the polyurethane dispersion and swollen in. Polymerisation was effected by using t-butyl hydroperoxide and isoascorbic acid.

The resulting polymer dispersion was translucent, had a low viscosity and contained a small amount of sediment.

EXAMPLE 2

A polyurethane dispersion was prepared as described in Example I. Polymerisation was initiated using t-butylhydroperoxide and isoascorbic acid. During polymerisation, a monomer mixture containing 97.2 parts of methyl methacrylate and 93 parts of butyl acrylate was fed in.

The resulting polymer dispersion was again translucent, of low viscosity and had a low sediment content.

COMPARATIVE EXAMPLE C1

A prepolymer solution was prepared from the following ingredients:

|  | Parts |
| --- | --- |
| Isophorone diisocyanate | 33.9 |
| Dimethylolpropionic acid | 6.0 |
| Polycarbonate diol | 58.9 |
| Trimethylolpropane | 0.6 |
| Cyclohexane dimethanol | 0.6 |
| Methyl methacrylate | 140 |
| Butyl acrylate | 93 |

The prepolymer solution was then neutralised with triethylamine, dispersed in water to 35% solids (including monomer) and extended with ethylene diamine.

The product was a white hazy dispersion with coarse particle size and heavy sediment. Phase separation occurred after 3 days.

Initiation with t-butyl hydroperoxide and isoascorbic acid after 1 day resulted in coagulation at the start of the polymerisation.

EXAMPLE 3

A. Polyurethane Preparation

The urethane prepolymer was prepared in a fourneck round bottom flask, equipped with a thermometer, mechanical stirrer, condenser, dry air or nitrogen blanket and heating mantle, by using the following formulation:

|  | Parts |
| --- | --- |
| Isophorone diisocyanate | 525.00 |
| Terathane-1000 (OH number - 114.3 mg KOH/g) | 635.33 |
| Dimethylolpropionic acid | 81.25 |
| 1,4-Cyclohexane dimethanol | 8.43 |
| Catalyst:Ferro 820 (tin-based) | 0.15 |
| Butyl acrylate | 313.85 |
| Inhibitor:Topanol O | 0.63 |

Half of the Ferro 820 was added before heating the mixture of diisocyanate and polyols and the other part after 1 hour at reaction temperature. 139.56 parts of the butyl acrylate were added before reaction, the remaining parts were used for diluting the prepolymer after the reaction. The inhibitor was equally divided over the butyl acrylate. Total reaction time took 2 hours, the reaction temperature was maintained at 90°-95° C. The residual NCO content was 5.59% (theoretical 5.64%).

The prepolymer was neutralized by mixing in 60.13 parts triethylamine at 50°-60° C. for half an hour. The neutralized prepolymer was dispersed in 3071.69 parts of demineralized water during 60 minutes. After dispersion, 44.17 parts hydrazine monohydrate were added to chain extend the NCO terminated prepolymer. The resulting polyurethane dispersion had a pH of 7.8, a Brookfield viscosity at 25° C of 37mPas and solids content of 27.3%.

(Terathane 1000 is a polytetramethylene glycol).

B. Urethane Vinyl Polymer Preparation

The radical polymerisation for producing the polymer dispersion having a urethane-acrylic polymer ratio of 40/60 was carried out using the following process:

In similar equipment under a nitrogen blanket were charged 1136.19 parts of the dispersion 508.66 parts demineralized water and 2.25 parts of tert. butyl hydroperoxide. To this dispersion were added 10% of the monomer feed listed below and 9 parts of a 2% i-ascorbic acid solution in water. (neutralized with ammonia to pH 7-9). After heating to 75° C, the remaining monomer feed was added over 60 minutes. The temperature was maintained at 75°±2° C. for 75 minutes. After the i-ascorbic acid feed was completed, the reaction medium was brought to 80°-82° C. for half an hour post-reaction before cooling.

| Monomer feed: | Parts |
| --- | --- |
| Methyl methacrylate | 301.95 |
| Butyl Methacrylate | 58.05 |
| Butyl acrylate | 15.00 |
| Dimethyl ethanol amine | 0.45 |

The obtained polyurethane-acrylic monomer showed the following specification; free monomer content of 0.02%, 0.14% sediment, pH of 8.0, a Brookfield viscosity at 25° C. of 160 mPas and contained 37.5% solids. The minimum film forming temperature was lower than 20° C. The end product had a blue white, nearly translucent appearance, the measured absorbance by spectrometry at 650 nm using a path length of 1 mm was 5.1. Some increase of viscosity was noticed after 4 weeks storage test at 50° C. The film cast on a glass plate with film thickness of 30 micron dry showed a könig hardness of 136 sec. Ethanol and methyl ethyl ketone double rubs were 43X and 155x respectively.

EXAMPLE 4

A. Polyurethane Preparation

Preparation of a polyurethane dispersion was by a procedure similar to that of Example 3, the prepolymer being based on polycarbonate diol and a triol and methyl methacrylate being used as reactive diluent.

| Prepolymer components: | Parts |
| --- | --- |
| Isophorone diisocyanate | 536.32 |
| Permanol KM-10-122 (OH = 55.49 mg KOH/g) | 930.68 |
| Dimethylolpropionic acid | 94.80 |
| Trimethylolpropane | 9.48 |
| 1,4-cyclohexane dimethanol | 8.89 |
| Ferro 820 tin based catalyst | 0.19 |
| Methyl methacrylate | 678.21 |
| Topanol O inhibitor | 1.36 |

The prepolymer reaction took 3 hours. The 90% solution in methyl methacrylate was further diluted till 80% and 70% after 1 and 2 hours reaction time.

Components for preparing the polyurethane dispersion.

|  | Parts |
| --- | --- |
| Prepolymer | 685.71 |
| Triethylamine | 21.28 |
| Demineralized water | 1260.02 |
| Ethylene diamine | 20.73 |

The low viscous translucent urethane dispersion contained 25.3% solids, <0.02% sediment was found.

B. Urethane Vinyl Polymer Preparation

| Components: | Parts |
| --- | --- |
| Polyurethane dispersion | 372.70 |
| Demineralized water | 265.87 |
| Tert. butylhydroperoxide | 1.31 |
| iso-ascorbic acid solution 1% in water | 63.80 |
| Methyl methacrylate | 87.43 |
| Butyl acrylate | 84.00 |
| Dimethyl ethanolamine | 0.21 |

The urethane vinyl polymer ratio was 30/70.

| Specifications: | |
| --- | --- |
| Solids | 34.3% |
| pH | 7.7 |
| viscosity at 25° C. | 10 mPas |
| sediment | <0.02% |
| appearance | blue-white |
| Absorbance (at 650 nm) | 31 |
| minimum film forming temperature | <15° C. |
| Film properties: | |
| König hardness | 78 sec |
| Ethanol double rub | 18x |

| | |
|---|---|
| -continued | |
| MEK double rub | 48x |

EXAMPLE 5

A polyurethane vinyl polymer was prepared using a urethane dispersion and other components in the recipe for the radical polymerization as described in Example 4.

However, the radical polymerization procedure was as follows:

First addition of the monomer blend to the diluted polyurethane dispersion, followed by addition of tert. butyl hydroperoxide and 10% of the iso-ascorbic acid solution.

Further feeding of the iso-ascorbic acid solution at 40° C. resulted in an exothermic reaction, causing a peak temperature at 79° C. After 30 minutes feeding time and 30 minutes post-reaction at 80°-82° C., a free monomer content was found at 0.02%

| Other specifications are | |
|---|---|
| Solids | 34.3% |
| pH | 7.9 |
| Viscosity at 25° C. | 10 mPas |
| Sediment | <0.02% |
| Appearance | blue-white |
| Absorbance | 24 |
| minimum film forming temperature | 23° C. |

The urethane vinyl ratio was 30/70.

COMPARATIVE EXAMPLE C2

The polyurethane prepolymer, described in Example 4, was diluted with methyl methacrylate and butyl acrylate so that the final urethane vinyl polymer ratio should become 30/70. the recipe for dispersing this prepolymer was as follows:

| | Parts: |
|---|---|
| Polyurethane prepolymer | 285.71 |
| Methyl methacrylate | 194.29 |
| Butyl acrylate | 186.67 |
| Triethylamine | 8.87 |
| Demineralised water | 1245.27 |
| Ethylenediamine | 8.64 |

Neutralising, dispersing and chain extending the prepolymer-monomer blend resulted in a hazy white mixture with a coarse particle size and much sediment. Solids including the monomers was 35%. Phase separation occurred after 3 days.

This product was subjected to a radical polymerization after 1 day. First adding the tert. butylhydroperoxide and feeding the iso-ascorbic acid at 40° C. did not result in an exothermic reaction; heating to 60° C. also did not result in an exothermic reaction. Finally, the mixture gelled after 75 minutes reaction time.

EXAMPLE 6

A. Polyurethane Preparation

The procedure was identical to Example 3. However, the urethane polymer, was modified With a triol and a tetra functional amine. The prepolymer was prepared in presence of 134.63 parts of butyl acrylate. The residual butyl acrylate and acrylonitrile were used for dilution after completing the prepolymer reaction, but before the dispersion step. Ethylene diamine and triethylene tetramine were used as extension agents.

| Prepolymer components: | parts: |
|---|---|
| Isophorone diisocyanate | 512.69 |
| Terathane-1000 (OH = 114.3 mg KOH/g) | 595.80 |
| Dimethylol propionic acid | 78.00 |
| Trimethylol propane | 13.51 |
| Ferro 820 tin based catalyst | 0.14 |
| Butyl acrylate | 150.74 |
| Acrylonitrile | 150.74 |
| Inhibitor Topanol O | 0.60 |

The prepolymer contained 5.16% NCO (theoretical 5.73%.

Components for preparing the polyurethane dispersion.

| | parts: |
|---|---|
| Prepolymer | 1502.22 |
| Triethylamine | 57.73 |
| Demineralized water | 3416.47 |
| Ethylene diamine | 51.39 |
| Tri ethylene tetra amine | 6.42 |

The polyurethane dispersion showed a translucent appearance. The solids content was 25%.

B. Urethane Vinyl Polymer Preparation

According to the procedure described in Example 3, the following components were used for the polymerization:

| | parts: |
|---|---|
| polyurethane dispersion | 670.24 |
| Demineralized water | 203.36 |
| Tert. butyl hydroperoxide | 1.50 |
| Iso-ascorbic acid solution, 1% in water | 72.75 |
| Butyl acrylate | 52.00 |
| Methyl methacrylate | 84.00 |
| Acrylonitrile | 52.00 |
| Allyl methacrylate | 12.00 |
| Dimethyl ethanol amine | 0.24 |

Since 0.60% free monomer was still present, a post-reaction with ammonium persulphate was necessary.

Therefore, 4.67 g of a 10% ammonium persulphate solution (neutralized with ammonia to pH 8) was added and the reaction mixture was heated to 90°-92° C. and held at this temperature for half an hour before cooling. The free monomer content was then 0.06%.

The polyurethane-vinyl polymer ratio was 40/60.

The specification of the resulting dispersion was as follows:

| solids | 35.2% |
|---|---|
| pH | 8.0 |
| viscosity at 25° C. | 600 mPas |
| sediment | 0.30% |
| minimum film forming temperature | 16° C. |
| appearance | blue white |
| absorbance (at 650 nm) | 31 |

The storage stability at 50° C. was insufficient, in the third week the polymer gelled. However, at ambient temperature, the dispersion was stable for more than one year.

| Film properties: | |
|---|---|
| König hardness | 144 sec |
| Ethanol double rub | 15x |
| MEK double rub | 20x |

EXAMPLE 7

This Example describes the preparation of a urethane-vinyl polymer with the same polyurethane dispersion, same components in the same ratios and a comparable radical polymerization as in Example 6, but a sequential monomer feed was used for introducing acrylonitrile in the first and 90% of the allyl methacrylate in the second feed.

| Recipe for the radical polymerization: | Parts: |
|---|---|
| Polyurethane dispersion | 670.24 |
| Demineralized water | 203.36 |
| Tert butyl hydroperoxide | 1.50 |
| Iso ascorbic acid solution, 1% in water | 72.75 |
| First monomer feed: | |
| Butyl acrylate | 30.40 |
| Methyl methacrylate | 58.80 |
| Acrylonitrile | 52.00 |
| Allyl methacrylate | 1.20 |
| Dimethyl ethanol amine | 0.17 |
| Second monomer feed: | |
| Butyl acrylate | 21.60 |
| Methyl methacrylate | 25.20 |
| Allyl methacrylate | 10.80 |
| Dimethyl ethanol amine | 0.07 |
| The urethane-vinyl ratio was 40/60. | |
| The ratio first/second monomer feed was 70/30. | |
| Specification: | |
| solids | 35.1% |
| pH | 8.5 |
| viscosity at 25° C. | 111 mPas |
| sediment | 0.08% |
| free monomer | 0.02% |
| minimum film forming temperature | 16° C. |
| appearance | blue white |
| absorbance (at 650 nm) | 25 |
| storage stability at 50° C., for 4 weeks | OK |
| Film properties: | |
| König hardness | 135 sec |
| Ethanol double rub | 20x |
| MEK double rub | 31x |

EXAMPLE 8

Polyurethane-vinyl polymer based on the polyurethane dispersion as mentioned in Example 3, the acrylic part being modified with styrene. The urethane-vinyl polymer ratio was 50/50.

| Recipe for the radical polymerization: | parts: |
|---|---|
| Polyurethane dispersion (30.0% solids) | 1340.20 |
| Demineralized water | 245.75 |
| Tert butyl hydroperoxide | 2.46 |
| Iso-ascorbic acid solution, 1% in water | 116.78 |
| Styrene | 141.51 |
| Methyl methacrylate | 117.92 |
| Acrylonitrile | 35.38 |
| Specification: | |
| solids | 35.4% |
| pH | 8.0 |
| viscosity at 25° C. | 19 mPas |
| sediment | 0.02% |
| free monomer | 0.40% |
| minimum film forming temperature | <15° C. |
| absorbance (at 650 nm) | 19 |
| appearance | blue white |
| Film properties: | |
| König hardness | 101 sec |
| Ethanol double rub | 10x |
| MEK double rub | 10x |

EXAMPLE 9

Polyurethane vinyl polymer based on the polyurethane dispersion as described in Example 3, the acrylic part modified with styrene as in Example 8, but with a polyurethane-vinyl polymer ratio of 20/80.

| Recipe for the radical polymerization: | Parts: |
|---|---|
| Polyurethane dispersion (30.0% solids) | 496.72 |
| Demineralized water | 778.30 |
| Tert butylhydroperoxide | 3.64 |
| Iso-ascorbic acid solution, 1% in water | 175.00 |
| Styrene | 209.79 |
| Methyl methacrylate | 174.83 |
| Acrylonitrile | 52.45 |
| Butyl acrylate | 109.24 |
| Specification: | |
| Solids | 35.7% |
| pH | 7.7 |
| Viscosity at 25° C. | 16 mPas |
| Sediment | 0.03% |
| Free monomer | 0.25% |
| Minimum film forming temperature | 43° C. |
| Absorbance | 31 |
| Appearance | blue-white |
| Film properties: | |
| König hardness | 180 sec |
| Ethanol double rub | 30x |
| MEK double rub | 30x |

EXAMPLE 10

A. Polyurethane Preparation

A polyesterdiol based polyurethane was prepared following the procedure of Example 1. The prepolymer was diluted with the butyl acrylate-Topanol O solution, but not until the prepolymer preparation was finished.

| Prepolymer components | Parts: |
|---|---|
| Isophorone diisocyanate | 1561.44 |
| Ruco S-1063-120 polyester (OH = 116.7 mg KOH/g) | 1542.33 |
| Dimethylol propionic acid | 218.24 |
| 1,4-Cyclohexane dimethanol | 38.68 |
| Ferro 820 catalyst | 0.40 |
| Butyl acrylate | 839.77 |
| Topanol O inhibitor | 1.68 |

The prepolymer contained 6.51% NCO (7.04% NCO theoretical).

| Recipe for preparing the polyurethane dispersion: | |
|---|---|
| Prepolymer | 3200.00 |
| Triethylamine | 123.00 |
| Demineralized water | 5523.33 |
| Ethylene diamine | 134.14 |
| Specification of polyurethane dispersion: | |
| Solids | 26.0% |
| pH | 7.5 |
| Viscosity at 25° C. | 28 mPas |
| Sediment | 0.08% |
| Appearance | blue-white |

B. Urethane-Vinyl Polymer Preparation

Radical polymerization was according to the procedure of Example 3. However, the iso-ascorbic acid reducing agent was replaced by sodium sulphoxylate formaldehyde.

| The following recipe was used: | Parts: |
|---|---|
| Polyurethane dispersion | 1067.41 |
| Demineralized water | 455.06 |
| Tert butylhydroperoxide | 2.62 |
| Sodium sulphoxylate formaldehyde, 1% in water | 126.00 |
| Methyl methacrylate | 280.94 |
| Butyl methacrylate | 54.01 |
| Butyl acrylate | 13.96 |

The urethane-vinyl polymer ratio was 40/60.

| Specification: | |
|---|---|
| Solids | 34.6% |
| pH | 8.1 |
| Viscosity at 25° C. | 9 mPas |
| Sediment | 0.10% |
| Free monomer | 0.12% |
| Minimum film forming temperature | 39° C. |
| Absorbance (at 650 nm) | 56 |
| Appearance | hazy, white |
| Film properties: | |
| König hardness | 163 sec |
| Ethanol double rub | 30x |
| MEK double rub | 120x |

EXAMPLE 11

A. Polyurethane Preparation

A polycaprolactonediol and 4,4'-methylene bis (cyclohexyl) diisocyanate based polyurethane was prepared as described in Example 3. Butyl acrylate and the catalyst were added before starting the prepolymer preparation. The reaction temperature was held at 80°-85° C. for 2 hours.

| Prepolymer components | Parts: |
|---|---|
| 4,4'-methylene bis (cyclohexyl) diisocyanate | 597.36 |
| Polycaprolactonediol (OH = 92.7 mg KOH/g) | 846.64 |
| Dimethylol propionic acid | 76.00 |
| Ferro 860 tin-based catalyst | 0.58 |
| Butyl acrylate | 379.40 |
| Topanol O inhibitor | 0.75 |

The prepolymer contained 4.20% NCO (theoretical 4.42%).

| | Parts: |
|---|---|
| Recipe for preparing the urethane dispersion: | |
| Prepolymer | 600.00 |
| Triethylamine | 17.34 |
| Demineralized water | 1405.54 |
| Hydrazine monohydrate | 13.90 |
| Specification of polyurethane dispersion: | |
| Solids | 23.5% |
| pH | 8.6 |
| Sediment | <0.02 |
| Viscosity at 25° C. | 36 mPas |
| Appearance | colourless, translucent |

B. Urethane-Vinyl Polymer Preparation

Radical polymerization according to Example 3.

| | Parts: |
|---|---|
| Recipe: | |
| Polyurethane dispersion | 1412.40 |
| Demineralized water | 213.73 |
| Tert butylhydroperoxide | 2.21 |
| Iso-ascorbic acid, 1% solution in water | 106.00 |
| Methyl methacrylate | 258.58 |
| Butyl methacrylate | 7.08 |
| The urethane-vinyl polymer was 50/50. | |
| Specification: | |
| Solids | 33.5% |
| pH | 8.0 |
| Viscosity at 25° C. | 17 mPas |
| Sediment | <0.02% |
| Free monomer | 0.11% |
| Minimum film forming temperature | 31° C. |
| Absorbance | 7.7 |
| Appearance | blue-white |
| Film properties: | |
| König hardness | 150 sec |
| Ethanol double rubs | 140x |
| MEK double rubs | >200x |

EXAMPLE 12

A. Polyurethane Preparation

Polyurethane based on toluene diisocyanate (80/20 ratio for the 2.4 and 2.6 isomers) and diphenylmethane diisocyanate (75/25 ratio for the 4.4' and 2.4' isomers).

| Recipe for prepolymer preparation: | Parts: |
|---|---|
| Toluene diisocyanate | 246.00 |
| Diphenylmethane diisocyanate | 246.00 |
| Terathane-1000 polyetherdiol (OH = 114.3 mg KOH/g) | 579.24 |
| 1.4-Cyclohexane dimethanol | 8.76 |
| Dimethylol propionic acid | 120.00 |
| Butyl acrylate | 133.33 |
| Methyl methacrylate | 266.67 |
| Styrene | 400.00 |
| Topanol O inhibitor | 1.60 |

The urethane prepolymer was prepared by first feeding the polyetherdiol and 1,4-cyclohexyl dimethanol blend to the diisocyanate solution in 1 hour and maintaining the reaction temperature at 50°-55° C. The procedure was continued by the addition of dimethylol propionic acid in 1 hour while keeping the temperature at 55°-60° C. The reaction mixture was held at 55°-60° C. for another 6 hours and 2 hours at 65°-70° C. In the meantime, the mixture was diluted with butyl acrylate, methyl methacrylate and styrene after 3, 9 and 10 hours reaction time. The NCO content was then 3.73%. (Theoretical 3.25%).

The urethane dispersion was prepared by the addition of 400.00 parts prepolymer in 1 hour to an aqueous phase which contain 26.05 parts triethyl amine, 1.04 parts hydrazine and 841.18 parts water. The residual 0.35 parts hydrazine were simultaneously fed, also in 1 hour at ambient temperature.

| Specification of polyurethane dispersion: | |
|---|---|
| Solids | 24.1% |
| pH | 8.2 |
| Viscosity at 25° C. | 900 mPas |
| Sediment | 0.04% |

| | |
|---|---|
| Specification of polyurethane dispersion: | |
| Absorbance | 19 |
| Appearance | blue-white |

B. Urethane-Vinyl Polymer Preparation

Radical polymerization following the procedure described in Example 3.

| Recipe: | Parts: |
|---|---|
| Polyurethane dispersion | 851.75 |
| Demineralized water | 309.62 |
| Tert butyl hydroperoxide | 1.25 |
| Iso ascorbic acid, 1% solution in water | 60.00 |
| Styrene | 88.60 |
| Methyl methacrylate | 15.56 |
| Acrylonitrile | 18.00 |
| Butyl acrylate | 11.10 |
| The urethane-vinyl polymer ratio was 50/50. | |
| Specification: | |
| Solids | 30.1% |
| pH | 8.1 |
| Viscosity at 25° C. | 29 mPas |
| Sediment | 0.40% |
| Free monomer | 0.20% |
| Absorbance | 143 |
| Appearance | slightly hazy, white-yellow |
| Film properties: | |
| König hardness | 136 sec |
| Ethanol double rub | >200x |
| MEK double rub | 80x |

EXAMPLE 13

A. Polyurethane Preparation

The urethane polymer was prepared by a procedure similar to that of Example 3, but was modified with ethylene diamine and a tetra functional amine. The 90% prepolymer in butyl acrylate was further diluted to 80% after the prepolymer preparation:

| Prepolymer components: | Parts: |
|---|---|
| Isophorone diisocyanate | 672.00 |
| Terathane-1000 polyether (OH = 114.3 mg KOH/g) | 813.22 |
| Dimethylol propionic acid | 104.00 |
| 1,4-Cyclohexane dimethanol | 10.78 |
| Ferro 820 catalyst | 0.20 |
| Butyl acrylate | 400.00 |
| Topanol O inhibitor | 0.80 |

The prepolymer contained 5.42% NCO. (Theoretical 5.64%).

| | Parts: |
|---|---|
| Recipe for preparing the polyurethane dispersion: | |
| Prepolymer | 600.00 |
| Triethylamine | 23.08 |
| Demineralized water | 1212.89 |
| Ethylene diamine | 19.13 |
| Triethylene tetramine | 2.39 |
| Specification of polyurethane dispersion: | |
| Solids | 27.5% |
| pH | 7.7 |
| Viscosity at 25° C. | 27 |
| Sediment | >0.02% |
| Absorbance (at 650 nm) | 2.1 |

| | Parts: |
|---|---|
| Appearance | translucent |

B. Urethane-Vinyl Polymer Preparation

Radical polymerization based on azo-bis (isobutyronitrile) initiator. Diallyl phthalate was incorporated as difunctional component.

The procedure was as follows:

The monomer blend including the initiator were fed to the diluted polyurethane dispersion for 1 hour, keeping the reaction temperature at 80°±2° C. After half an hour postreaction at 90°±2° C., a free monomer content was found of 0.02%.

| Recipe for radical polymerization: | Parts: |
|---|---|
| Urethane dispersion | 483.73 |
| Demineralized water | 162.24 |
| Azo-bis (isobutyronitrile) | 0.75 |
| Butyl acrylate | 2.24 |
| Butyl methacrylate | 12.50 |
| Methyl methacrylate | 78.39 |
| Diallyl phthalate | 0.63 |

The urethane-vinyl polymer ratio was 50/50.

| Specification: | |
|---|---|
| Solids | 32.3% |
| pH | 8.6 |
| Viscosity at 25° C. | 82 |
| Sediment | 1.0% |
| Free monomer | 0.02% |
| Absorbance (at 650 nm) | 18 |
| Appearance | blue-white |

EXAMPLE 14

A. Polyurethane Preparation

Urethane polymer based on Terathane-2000 polyether diol and 4.4'methylene bis (cyclohexyl) diisocyanate, prepared as described in Example 3. The catalyst was totally added before and methyl methacrylate was added after finishing the prepolymer preparation.

| Prepolymer components: | Parts: |
|---|---|
| 4.4'-Methylene bis (cyclohexyl) diisocyanate | 1266.15 |
| Terathane 2000 polyetherdiol (OH = 56.7 mg KOH/g) | 1693.85 |
| Dimethyl propionic acid | 240.00 |
| Ferro 860 tin-based catalyst | 1.23 |
| Methyl methacrylate | 799.98 |
| Topanol O inhibitor | 1.60 |

The prepolymer contained 4.36% NCO (theoretical 4.47%).

| | Parts: |
|---|---|
| Recipe for preparing the polyurethane dispersion: | |
| Prepolymer | 3100.00 |
| Triethylamine | 138.97 |
| Demineralized water | 6403.72 |
| Hydrazine monohydrate | 71.69 |
| Specification of the polyurethane dispersion: | |
| Solids | 26.1 |

-continued

| | Parts: |
|---|---|
| pH | 8.3 |
| Viscosity at 25° C. | 19 mPas |
| Sediment | 0.02% |
| Absorbance (at 650 nm) | 0.1 |
| Appearance | clear, colourless |

B. Urethane-Vinyl Polymer Preparation

The radical polymerization, with a urethane-vinyl polymer ratio of 70/30 was carried out as follows:

A dimethyl ethanol amine (DMEA) neutralized mixture of 0.34 parts tert butyl hydroperoxide and 22.90 parts demineralized water (pH=8.0) was blended with 500 parts of above described urethane dispersion in the reactor. 0.17 parts isoascorbic acid dissolved in 17.00 parts demineralized water was neutralized with DMEA till pH=8.0. 10% of this mixture was added to the reactor phase. The reaction mixture was heated till 85° C. When the reaction mixture reached 75° C. the monomer feed was started. Total feed-time for the monomer mixture was 15 minutes. At the same time with the monomer feed the remaining isoascorbic acid solution was fed in. This feed lasted for 30 minutes. After completion of this, the mixture was kept at 85° C for another 30 minutes after which the reactor was stripped at 85° C for 30 minutes.

The specification of the 70/30 urethane/acrylate dispersion was as follows:

| Solids | 33.0 |
|---|---|
| pH | 7.7 |
| Viscosity at 25° C. | 30 |
| Sediment | <0.02% |
| Minimum film forming temperature | <15 |
| Appearance | blue-white |

We claim:

1. A process for preparing a surfactant-free aqueous polymer dispersion containing an anionic water-dispersible polyurethane and a vinyl polymer in a weight ratio of from about 80:20 to about 30:70, said process comprising:
    (A) forming a solution of an anionic water-dispersible isocyanate-terminated polyurethane in at least one vinyl monomer;
    (B) dispersing the solution in an aqueous medium
    (C) chain extending the polyurethane, and thereafter either
    (D) adding further vinyl monomer, and
    (E) initiating polymerisation of the vinyl monomer, or
    (F) initiating polymerisation of the vinyl monomer, and
    (G) adding further vinyl monomer during polymerisation.

2. A process according to claim 1 wherein the anionic water-dispersible isocyanate-terminated polyurethane is a reaction product of:
    (i) an organic polyisocyanate;
    (ii) a polymeric polyol having a molecular weight of from 500 to 6000;
    (iii) an isocyanate-reactive compound having at least one acid group and at least two groups that are more reactive than the acid group towards isocyanates, and, optionally
    (iv) a low molecular weight polyol having a molecular weight below 500.

3. A process according to claim 1 wherein the isocyanate-reactive compound having at least one acid group is a carboxy group containing diol or triol.

4. A process according to claim 3 wherein the carboxy group containing diol or triol is a dihydroxy alkanoic acid of the formula:

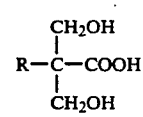

wherein R is hydrogen or alkyl.

5. A process according to claim 3 wherein R is methyl.

6. A process according to claim 1 wherein the vinyl monomer is selected from methyl methacrylate, butyl acrylate, butyl methacrylate, acrylonitrile, allyl methacrylate, styrene and mixtures of two or more of said monomers.

7. A process according to claim 1 wherein the proportion of monomer used as solvent for the isocyanate-terminated polyurethane in step A is from 1.5 to 95% by weight of the total monomers.

8. A process according to claim 7 wherein the proportion of monomer used as solvent is from 2.5 to 80% by weight of the total monomers.

9. A process according to claim 8 wherein the proportion of monomer used as solvent is from 7 to to by weight of the total monomers.

10. A coating or film derived from a dispersion as prepared by the process of claim 1.

11. A composite article which includes a film as claimed in claim 10 as an adhesive layer.

* * * * *